United States Patent
Parris (10) Patent No.: US 9,284,483 B2
(45) Date of Patent: Mar. 15, 2016

(54) AQUEOUS CROSSLINKER SLURRY COMPOSITIONS AND APPLICATIONS

(75) Inventor: Michael D. Parris, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 401 days.

(21) Appl. No.: 12/851,205

(22) Filed: Aug. 5, 2010

(65) Prior Publication Data

US 2011/0030962 A1 Feb. 10, 2011

Related U.S. Application Data

(60) Provisional application No. 61/232,131, filed on Aug. 7, 2009.

(51) Int. Cl.

| | |
|---|---|
| *C09K 8/62* | (2006.01) |
| *E21B 43/26* | (2006.01) |
| *C09K 8/68* | (2006.01) |
| *C09K 8/03* | (2006.01) |
| *C09K 8/90* | (2006.01) |

(52) U.S. Cl.
CPC . *C09K 8/685* (2013.01); *C09K 8/03* (2013.01); *C09K 8/90* (2013.01)

(58) Field of Classification Search
CPC .......... C09K 8/685; C09K 8/62; E21B 43/26
USPC .................. 166/305.1, 308.1, 308.5; 507/211
See application file for complete search history.

(56) References Cited

U.S. PATENT DOCUMENTS

| | | | |
|---|---|---|---|
| 4,619,776 A | 10/1986 | Mondshine | |
| 5,082,579 A * | 1/1992 | Dawson | 507/211 |
| 5,145,590 A * | 9/1992 | Dawson | 507/211 |
| 5,430,105 A | 7/1995 | Redpath et al. | |
| 5,559,082 A * | 9/1996 | Sanner et al. | 507/273 |
| 6,225,264 B1 | 5/2001 | Moorhouse et al. | |
| 6,251,838 B1 | 6/2001 | Moorhouse et al. | |
| 6,368,369 B1 | 4/2002 | Sanduja et al. | |
| 6,645,262 B1 | 11/2003 | Sanduja et al. | |
| 6,936,576 B2 | 8/2005 | Ohsumi et al. | |
| 7,018,956 B2 | 3/2006 | Dobson, Jr. et al. | |
| 7,084,096 B2 * | 8/2006 | Harris et al. | 507/273 |
| 7,398,829 B2 * | 7/2008 | Hutchins et al. | 166/308.3 |
| 7,687,441 B2 * | 3/2010 | Hanes et al. | 507/261 |
| 2003/0144154 A1 * | 7/2003 | Dobson et al. | 507/200 |
| 2005/0272612 A1 * | 12/2005 | Dawson et al. | 507/211 |
| 2006/0089265 A1 * | 4/2006 | Hanes et al. | 507/203 |
| 2009/0082228 A1 * | 3/2009 | Parris et al. | 507/211 |

* cited by examiner

*Primary Examiner* — Catherine Loikith
(74) *Attorney, Agent, or Firm* — Tim Curington; Rachel Greene; Jeff Anderson (57) ABSTRACT

A method and composition for treating a subterranean formation penetrated by a wellbore including preparing an aqueous composition containing a source of boron, whereby boron is present in the slurry in an amount of about 1.7% or greater, by weight, based upon a total weight of the composition, combining the composition with a mixture comprising a viscosifier and aqueous medium to form a treatment fluid, wherein the composition is added to the mixture in an amount of about 0.5% or less, by volume, based upon a total volume of the treatment fluid, and contacting the formation with the treatment fluid to treat the formation. The source of boron may be boric acid.

8 Claims, 6 Drawing Sheets

AQUEOUS CROSSLINKER SLURRY COMPOSITIONS AND APPLICATIONS

PRIORITY

This application claims priority to U.S. Provisional Patent Application Ser. No. 61/232,131, entitled, "Aqueous Crosslinker Slurry Compositions and Applications," filed Aug. 7, 2009, which is incorporated by reference herein in its entirety.

FIELD

Embodiments of this invention relate to methods and compositions for treating a subterranean formation. Specifically, embodiments of this invention relate to methods and compositions for delivering and using a crosslinker for treating a subterranean formation.

BACKGROUND

Some statements may merely provide background information related to the present disclosure and may not constitute prior art.

Fluids with a viscosity that is individually tailored for a variety of physical and chemical conditions are needed to treat subterranean formations for the recovery of hydrocarbons. Often, to achieve a specific viscosity, a vicosifier will be introduced to a fluid, then pumped down a wellbore to fracture the formation rock. The variety of viscosifiers commercially available for this purpose is vast. Often, however, a small subset of commodity grade viscosifiers is selected for use. These viscosifiers may benefit from the presence of a crosslinker to increase or otherwise tailor the resulting fluid viscosity. The crosslinkers are selected for their ability to encourage crosslinking of the viscosifier depending upon the formation conditions and viscosifier properties. However, methods and compositions are needed so that the crosslinker is relatively easy to introduce to the treatment fluid, is stable during transport and active upon introduction to the fluid and/or upon exposure to subterranean formation conditions, and requires less bulk for transport to a work site.

SUMMARY

Embodiments of the invention relate to a method and composition for treating a subterranean formation penetrated by a wellbore including preparing an aqueous composition comprising a source of boron, whereby boron is present in the slurry in an amount of about 1.7% or greater, by weight, based upon a total weight of the composition, combining the composition with a mixture comprising a viscosifier and aqueous medium to form a treatment fluid, wherein the composition is added to the mixture in an amount of about 0.5% or less, by volume, based upon a total volume of the treatment fluid, and contacting the formation with the treatment fluid to treat the formation. Embodiments of the invention relate to a method and composition for treating a subterranean formation penetrated by a wellbore including preparing an aqueous composition comprising boric acid and a pH adjusting agent, combining the composition with mixture comprising a viscosifier and aqueous medium to form a treatment fluid, wherein the composition is added to the mixture in an amount of about 0.5% or less, by volume, based upon total volume of the treatment fluid, and contacting the formation with the treatment fluid to treat the formation.

DETAILED DESCRIPTION OF SOME EMBODIMENTS

The invention relates generally to compositions and methods for treating a subterranean formation. More specifically, disclosed are embodiments which use fluids containing polymers which are mixed and crosslinking with highly concentrated solutions of boron sources which minimizes the requisite volume of solution as well as formation temperature and pressure effects which may result in irreversible loss of treatment fluid viscosity.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

U.S. patent application Ser. No. 11/625,105 is incorporated herein by reference and describes how formation and down-hole pressure and temperature can have an impact on fluid rheology. Thus, it is desirable to design and deliver treatment fluids to overcome these difficulties. Some embodiments of the invention meet these needs.

Often, boron is delivered into the polymer solution for crosslinking in a number of forms, such as dissolved borax, slurry of solid borax or ulexite, boric acid solution, as well as other boron sources. However, as the concentration of the boron-containing crosslinker becomes more important, the amount of material transported to location for a treatment as well as the rate at which it is added on-the-fly into the polymer solution becomes logistically significant. It is a logistical advantage to have the chemical additives for a fracturing treatment as compact and/or concentrated as practical.

Borate based fracturing fluids are of two categories: non-delayed and delayed. The non-delayed borate fracturing treatments, which generally include those used at lower reservoir temperatures, account for approximately 70 percent of the total number of borate treatments. One common borate crosslinker for this treatment consists of borax dissolved in a water-cosolvent mixture and delivers approximately 20 ppm boron in the final fracturing fluid per gallon of crosslinker per 1000 gallon of fracturing fluid. At this concentration, it will take from about 6 gallons to 10 gallons of crosslinker per 1000 gallons of fracturing fluid. That concentration not only requires having multiple totes or special bulk containers for the wellsite, it also implies high costs and resources for the treatment operation.

Some embodiments disclosed herein utilize a slurried boric acid powder as a form for delivering a higher concentration of boron per unit volume and delivering it at a lower cost for a given boron concentration. The aqueous solubility of common boron sources is somewhat limited. One borax supplier estimates that the solubility of borax decahydrate is 4.71 percent at 20 DegC and borax pentahydrate is 3.59 percent at 20 DegC. While the solubility of these products can be improved by the addition of a cosolvent, such as glycerin or glycol (i.e. ethylene glycol), they cannot be slurried in aqueous solutions. Attempts to slurry them in aqueous solutions have resulted in generating highly viscous, non-flowing, paste-like gels. In contrast to borax as described above, it is unexpected that boric acid powder may be slurried in aqueous media and the powder in the slurry remains pourable.

In fact, one borax supplier estimates a limited solubility for boric acid (4.72 percent at 20 DegC), which is not consistent with the slurries that were formed in one embodiment of the invention. Multiple slurry compositions were prepared and tested between about 10 percent and about 25 percent by weight boric acid. These have been tested for suspension properties as well as low temperature pour-point properties. Some exemplary mixtures include:

1) boric acid powder+water+ethylene glycol+xanthan, and
2) boric acid powder+water+high salt concentration (such as NaBr)

In the first case, ethylene glycol is added for freeze-point depression and the xanthan for suspension properties. In the second case, the high salt concentration performs both functions. Other crosslinkers for delayed borate fracturing treatments which have high concentrations and compact delivery attributes can be used, such as those based on slurrying a boron-containing alkaline earth mineral such as ulexite or borax in an oil-based carrier, or ulexite or colemanite in an aqueous media. The slow dissolution of these materials provides a delay in crosslinking Examples are shown in U.S. Pat. No. 4,619,776 and U.S. Pat. No. 7,084,096, incorporated herein by reference thereto.

In another embodiment, an all-in-one liquid crosslinker includes a pH adjusting agent, boric acid, glycerine, and water. One example fluid comprises 18 percent NaOH, 18 percent boric acid, 15 percent glycerine, and 49 percent water. This product is a clear, colorless to light tan liquid with a density of approximately 1.35. Some embodiments may have a concentration of 10 to 30 percent pH modifier, 10 to 30 percent boric acid, 10 to 50 percent glycerine, and 10 to 70 percent water. Some embodiments may benefit from using a glycol such as ethylene glycol in place of or in addition to the glycerine of the crosslinker composition. The pH modifier may be caustic, potassium carbonate, potassium hydroxide, sodium hydroxide, or an amine containing compound. The pH of the crosslinker composition may be tailored to maximize the transportation, stability, and/or crosslinking properties of the compositions. Some embodiments may benefit from a pH of 8.5 to 13. Some embodiments may benefit from a pH of 9 to 12.

The advantages to this crosslinker composition are substantial. In addition to the cost advantage of this more tightly packaged system, lower transportation costs are experienced because of less water transport. Also, the process allows an operator to use less material at the wellsite. Additionally, the ratio of boron to NaOH or other pH modifier is more suited to creating a temperature- and pressure-stable gel.

Crosslinker solutions disclosed herein can be used with a variety of viscosifying agents, including, but not limited to, guar gums, high-molecular weight polysaccharides composed of mannose and galactose sugars, or guar derivatives such as hydroxypropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Another viscosifying agent is schizophyllan, which in some cases crosslinks with boron on a very slow kinetic: order of >10 hours in some conditions (Ref. Biomacromolecules 2004, 5, 126-136 "A Gel Network Constituted by Rigid Schizophyllan Chains and Nonpermanent Crosslinks". Synthetic polymers such as, but not limited to, polyvinylalcohol, polyacrylamide and polyacrylate polymers and copolymers, are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris et. al.

In some embodiments, the viscosifier is a water-dispersible, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2/C_3$, $C_3/C_4$, or $C_2/C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{18}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers can also be used.

As used herein, galactomannans comprise a polymannose backbone attached to galactose branches that are present at an average ratio of from 1:1 to 1:5 galactose branches:mannose residues. Preferred galactomannans comprise a 1→4-linked 13-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

When incorporated, the polymer-based viscosifier may be present at any suitable concentration. In various embodiments hereof, the gelling agent can be present in an amount of from about 5 to about 60 pounds per thousand gallons of liquid phase, or from about 15 to about 40 pounds per thousand gallons, from about 15 to about 35 pounds per thousand gallons, 15 to about 25 pounds per thousand gallons, or even from about 17 to about 22 pounds per thousand gallons. Generally, the gelling agent can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Hydroxypropyl guar, carboxymethyl hydroxypropyl guar, carboxymethyl guar, cationic functional guar, guar or mixtures thereof, are preferred polymers for use herein as a gelling agent. Fluids incorporating polymer based viscosifiers based viscosifiers may have any suitable viscosity, preferably a viscosity value of about 50 mPa-s or greater at a shear rate of about 100 s$^{-1}$ at treatment temperature, more preferably about 75 mPa-s or greater at a shear rate of about 100 s$^1$, and even more preferably about 100 mPa-s or greater.

In some embodiments, the crosslinker solution is highly concentrated boric acid, using in fracturing with such polymers as guar, or guar derivatives. The fluid may be non-foamed, foamed, or energized, depending upon the particular formation properties and treatment objective. The crosslinker slurry may include boric acid powder, water, and optionally-suspension aid, such as xanthan, clay or salt in any combination, and freeze point depressant to maintain flowability at <0 DegC.

When incorporated, the gas component of the fluids of the may be produced from any suitable gas that forms a foam or an energized fluid when introduced into the aqueous medium. See, for example, U.S. Pat. No. 3,937,283 (Blauer, et al.) hereinafter incorporated by reference. Preferably, the gas component comprises a gas selected from the group consisting of nitrogen, air, carbon dioxide and any mixtures thereof. More preferably the gas component comprises nitrogen, in any quality readily available. The gas component may in some cases assist in a fracturing operation and/or well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

Fluids used embodiments of the invention may further contain other additives and chemicals. These include, but are not necessarily limited to, materials such as surfactants, breakers, breaker aids, oxygen scavengers, alkaline pH adjusting agents, clay stabilizers (i.e. KCl, TMAC), high temperature stabilizers, alcohols, proppant, scale inhibitors, corrosion inhibitors, fluid-loss additives, bactericides, and the like. In some embodiments, one, a portion, or all of these components may be encapsulated. Also, they may include a co-surfactant to optimize viscosity or to minimize the formation of stable emulsions that contain components of crude oil.

Another embodiment of the invention is a method for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc.

New York, N.Y., 1987) and references cited therein, the disclosures of which are incorporated herein by reference thereto.

In most cases, a hydraulic fracturing consists of pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added.

In the fracturing treatment, fluids may be used in the pad treatment, the proppant stage, or both. The components of the fluid may be mixed on the surface. Alternatively, a portion of the fluid may be prepared on the surface and pumped down tubing while another portion could be pumped down the annular to mix down hole.

Another embodiment of the invention includes the use slurries and fluids based on the invention for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore.

In another embodiment, slurries and fluids based on the invention are useful for gravel packing a wellbore. As a gravel packing fluid, it preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

The following examples are presented to illustrate the preparation and properties of some embodiments of the invention, and should not be construed to limit the scope of the invention, unless otherwise expressly indicated in the appended claims. All percentages, concentrations, ratios, parts, etc. are by weight unless otherwise noted or apparent from the context of their use.

EXAMPLES

An example fluid comprising 18 percent NaOH, 18 percent boric acid, 15 percent glycerine, and 49 percent water has been successfully pumped on approximately 12 field jobs including wells near Midland, Tex. and Williston, N. Dak.

Also, sample boric acid slurries were prepared by combining the components and mixing with a high shear mixer. All samples were prepared with US Borax boric acid technical powder, Kelco Xanthan XC, Sigma-Aldrich ethylene glycol, and deionized water. Typically the xanthan and water were combined first and allowed to viscosify (hydrate), prior to mixing with ethylene glycol (if used) and boric acid powder. The powder was homogenized in the mixture with a high-speed IKA Ultra-Turrax T8 mixer. It was found that the powder was substantially easier to mix into and homogenize in the liquid components if the xanthan was added last, followed by mixing to hydrate the xanthan.

| | % WT | | | | 21 deg C. | −18deg C. | % wt Boron |
|---|---|---|---|---|---|---|---|
| Sample # | Boric Acid | Xanthan | Water | Ethylene Glycol | Pourable | Pourable | in Example |
| BAS-1 | 25 | 0.225 | 74.775 | 0 | Y | NT* | 4.37 |
| BAS-2 | 25 | 0.189 | 44.811 | 30 | Y | Y | 4.37 |
| BAS-3 | 25 | 0.270 | 44.730 | 30 | Y | Y | 4.37 |
| BAS-4 | 30 | 0.192 | 39.808 | 30 | Y | Y | 5.24 |
| BAS-5 | 35 | 0.168 | 34.832 | 30 | Y | N | 6.11 |
| BAS-8 | 20 | 0.384 | 79.616 | 0 | Y | NT | 3.49 |
| BAS-9 | 45 | 0.165 | 54.835 | 0 | Y | NT | 7.86 |
| BAS-10 | 50 | 0.150 | 49.850 | 0 | Y | NT | 8.74 |
| BAS-11 | 60 | 0.120 | 39.880 | 0 | N | NT | 10.48 |
| BAS-12 | 10 | 0.432 | 89.568 | 0 | Y | NT | 1.75 |
| BAS-13 | 15 | 0.408 | 84.592 | 0 | Y | NT | 2.62 |

*NT = NOT TESTED

Borate crosslinked fracturing fluids were prepared and tested with several of the above slurries to demonstrate the efficacy of this method, and results are presented further below.

Figure 1:
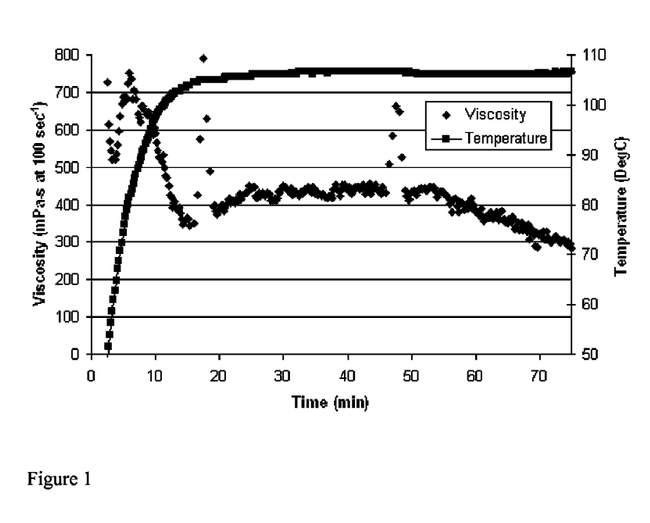
FIG. 1 is a plot of viscosity and temperature as a function of time for an embodiment of the invention.

In another example, 500 ml of a 0.36% by weight solution of HPG manufactured by Hercules was prepared on a Waring blender. To this, 2% by weight of KCl clay stabilizer, 0.12% by weight of sodium thiosulfate pentahydrate temperature stabilizer, and 0.2% by volume of a 30% by weight NaOH solution were added while continuing to blend on the Waring blender. Finally, 0.3% by volume of sample BAS-3 was added to the mixture, and the vortex closure time of 14 seconds was noted. The crosslinked fluid was placed in a Cup #1 and tested at 225 DegF (107 DegC) using a bob #5 on a Grace Instrument M5500 rheometer. The resultant plot of viscosity of the fluid at temperature is shown in FIG. 1, indicating a fracturing fluid with acceptable operational viscosity when tested using procedures outlined in ISO-13503 "Measurement of viscous properties of completion fluids".

Figure 2:
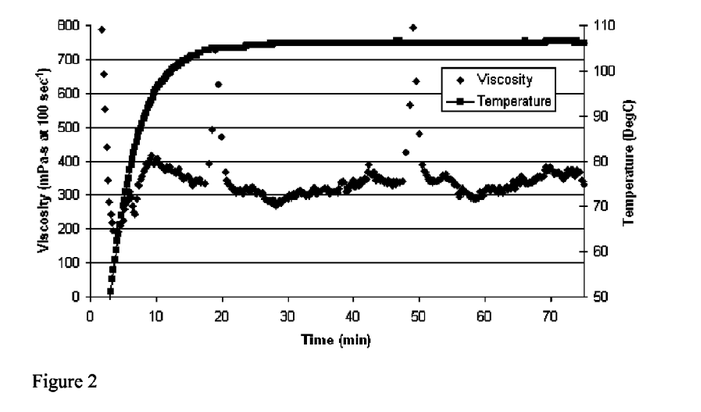
FIG. 2 is a plot of viscosity and temperature as a function of time for an additional embodiment of the invention.

In another example, 500 ml of a 0.36% by weight solution of guar supplied by Rhodia, Inc. was prepared in the manner of the example above. To this, 2% by weight KCl clay stabilizer, and 0.12% by weight sodium thiosulfate pentahydrate temperature stabilizer, and 0.2% by volume of a 30% by weight NaOH solution were added while continuing to blend on the Waring blender. Finally, 0.1% by volume of sample BAS-10 was added to the mixture, and the vortex closure time of 20 seconds was noted. The fluid efficacy and viability is illustrated by FIG. 2. FIG. 2 is a plot of viscosity and temperature as a function of time.

Figure 3:
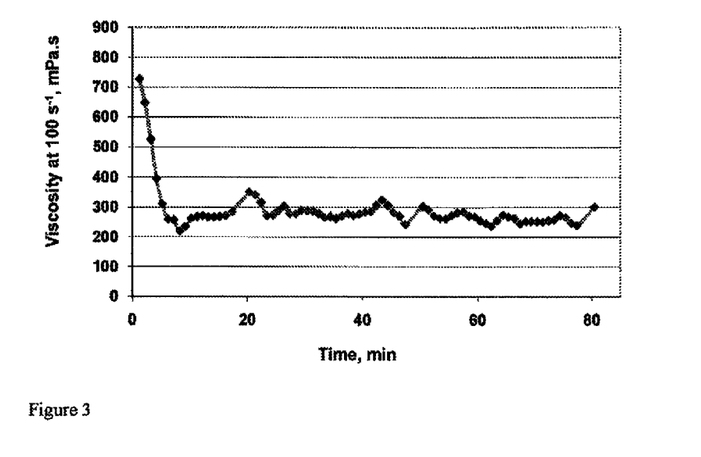
FIG. 3 is a plot of viscosity as a function of time for an additional embodiment of the invention.

FIG. 3 is a plot of viscosity as a function of time for an additional embodiment of the invention. It shows the rheology of 0.24 weight percent (20 lbm/1000 gal US or ppt) guar in tap water with 0.2 volume percent (2 gal/1000 gal or gpt) 50 percent tetramethylammonium chloride (TMAC) clay stabilizer at 66 degC.

Figure 4:
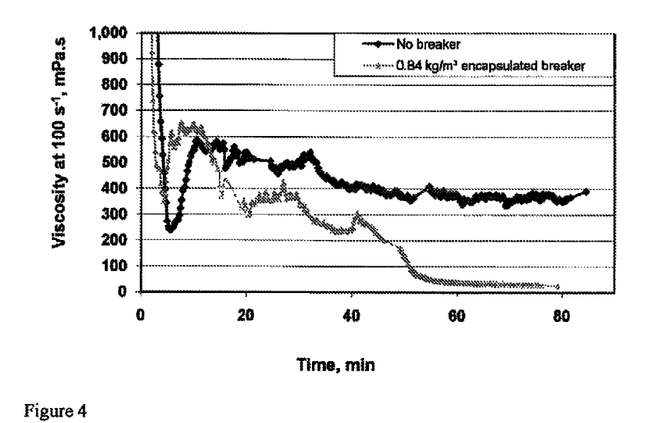
FIG. 4 is a plot of viscosity as a function of time for an additional embodiment of the invention comparing performance with and without breaker.

FIG. 4 is a plot of viscosity as a function of time for an additional embodiment of the invention comparing performance with and without breaker. It shows the rheology of 0.42 weight percent (35 ppt) guar in tap water with 2 weight percent KCl at 107 degC.

Figure 5:
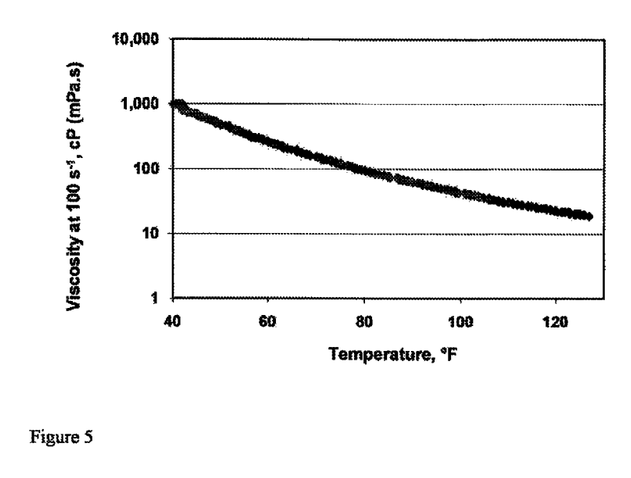
FIG. 5 is a plot of viscosity as a function of temperature for an additional embodiment of the invention.

FIG. 5 is a plot of viscosity as a function of temperature for an additional embodiment of the invention. It shows the viscosity of "Neat" crosslinker liquid (a fluid comprising 18 percent NaOH, 18 percent boric acid, 15 percent glycerine, and 49 percent water) as a function of temperature and shows that it is pumpable/meterable at ambient-type conditions.

Figure 6:
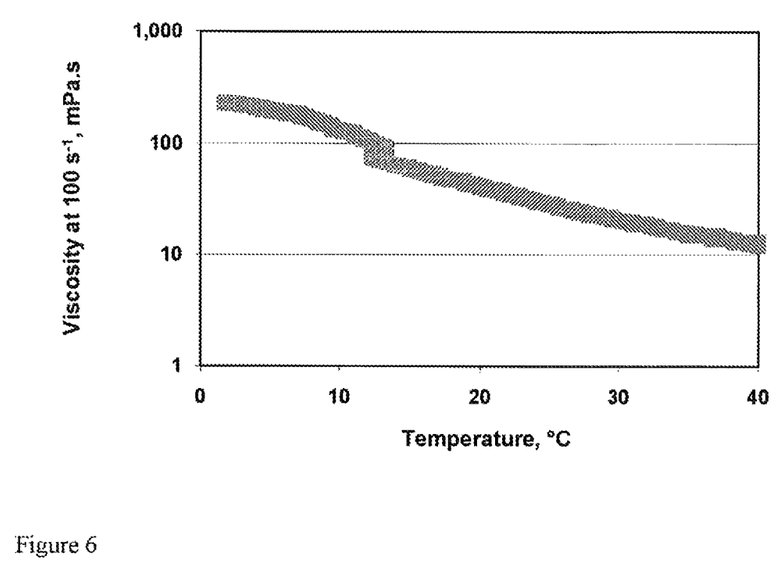
FIG. 6 is a plot of viscosity as a function of temperature for an additional embodiment of the invention.

FIG. 6 is also a plot of viscosity as a function of temperature for an additional embodiment of the invention. Viscosity of "Neat" crosslinker liquid (a fluid comprising 18 percent NaOH, 18 percent boric acid, 15 percent glycerine, and 49 percent water) as a function of temperature and shows that it is pumpable/meterable at ambient-type conditions. The difference in the behavior of the fluids in FIGS. 5 and 6 is attributed to the use of different supplies of glycerine.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of treating a subterranean formation penetrated by a wellbore, the method comprising:
    preparing an aqueous crosslinker slurry composition comprising water and a solid source of boron as a crosslinker, whereby boron is present in the slurry in an amount of about 1.7% or greater, by weight, based upon a total weight of the crosslinker slurry composition;
    combining the crosslinker slurry composition with a mixture comprising a viscosifier and an aqueous medium to form a treatment fluid, wherein the crosslinker slurry composition is added to the mixture in an amount of about 0.5% or less, by volume, based upon a total volume of the treatment fluid;
    increasing a viscosity of the treatment fluid with the solid source of boron as the crosslinker; and,
    contacting the formation with the treatment fluid to treat the formation.

2. The method of claim 1, wherein the solid source of boron is boric acid.

3. The method of claim 2, wherein the crosslinker slurry composition comprises from about 10% to about 50% by weight boric acid based upon total slurry composition weight.

4. The method of claim 1, wherein the boron is present in the composition in an amount of about 5% or greater, by weight, based upon total weight of the crosslinker slurry composition.

5. The method of claim 1, wherein the crosslinker slurry composition is added to the mixture in an amount of about 0.2% or less, by volume, based upon total volume of the treatment fluid.

6. The method of claim 1, wherein the crosslinker slurry composition further comprises xanthan.

7. The method of claim 1, wherein the boron is present in the crosslinker slurry composition in an amount of about 8% or greater, by weight, based upon total weight of the crosslinker slurry composition.

8. The method of claim 1, wherein the boron is present in the crosslinker slurry composition in an amount of about 4% or greater, by weight, based upon total weight of the slurry composition.

* * * * *